US012464032B2

(12) United States Patent
Hüffner et al.

(10) Patent No.: US 12,464,032 B2
(45) Date of Patent: Nov. 4, 2025

(54) SYSTEM AND METHOD FOR VISUAL IDENTIFICATION OF DISPLAYED APPLICATIONS IN ELECTRONIC COMMUNICATIONS

(71) Applicant: THETA LAKE, INC., Santa Barbara, CA (US)

(72) Inventors: Sharon Hüffner, Berlin (DE); Richard B. Sutton, San Mateo, CA (US); Devin H. Redmond, Encinitas, CA (US)

(73) Assignee: THETA LAKE, INC., Santa Barbara, CA (US)

( * ) Notice: Subject to any disclaimer, the term of this patent is extended or adjusted under 35 U.S.C. 154(b) by 0 days.

(21) Appl. No.: 17/883,221

(22) Filed: Aug. 8, 2022

(65) Prior Publication Data

US 2023/0069524 A1    Mar. 2, 2023

Related U.S. Application Data

(60) Provisional application No. 63/237,335, filed on Aug. 26, 2021.

(51) Int. Cl.
*H04L 65/401* (2022.01)
*G06F 21/50* (2013.01)
*G06V 20/40* (2022.01)

(52) U.S. Cl.
CPC .......... *H04L 65/4015* (2013.01); *G06F 21/50* (2013.01); *G06V 20/46* (2022.01)

(58) Field of Classification Search
CPC ...... H04L 65/4015; G06V 20/46; G06F 21/50
See application file for complete search history.

(56) References Cited

U.S. PATENT DOCUMENTS

| 8,234,688 | B2 | 7/2012 | Grandison |
| 9,503,482 | B1 | 11/2016 | Hugenbruch |
| 10,038,785 | B1 * | 7/2018 | Wu ........................ G06V 20/40 |
| 10,474,416 | B1 * | 11/2019 | Farivar ............... H04L 65/4015 |

(Continued)

FOREIGN PATENT DOCUMENTS

CN    114389955 A    4/2022

OTHER PUBLICATIONS

Office Action issued in No. U.S. Appl. No. 17/862,448 mailed Nov. 10, 2022, 10 pgs.

(Continued)

*Primary Examiner* — Dhairya A Patel
(74) *Attorney, Agent, or Firm* — SPRINKLE IP LAW GROUP

(57) ABSTRACT

A security and compliance platform ingests content from heterogeneous collaboration platforms and processes the content to detect potential regulatory, privacy, and security risks in the conversations. One of the detections that can be applied is the identification of application windows appearing during a collaboration screen share. Because these applications may contain sensitive personally identifiable information (PII), technical trade secrets, or highly confidential corporate information, there is meaningful utility in identifying instances when these applications are shared. If applications shared on screen is detected, a corresponding workflow action may be implemented, for example flagging a session for further analysis in a review screen of the security and compliance platform.

17 Claims, 4 Drawing Sheets

(56) References Cited

U.S. PATENT DOCUMENTS

| | | |
|---|---|---|
| 10,810,361 B1 | 10/2020 | Venkatraman |
| 11,310,283 B1 | 4/2022 | Hatch |
| 11,438,233 B1 | 9/2022 | Nadir |
| 11,792,076 B2 | 10/2023 | Nadir |
| 12,073,851 B2 * | 8/2024 | Reece .................... G06N 3/044 |
| 12,096,152 B2 * | 9/2024 | Baughman .......... H04L 12/1822 |
| 12,206,553 B2 | 1/2025 | Nadir et al. |
| 2003/0182422 A1 | 9/2003 | Bradshaw et al. |
| 2008/0232277 A1 | 9/2008 | Foo et al. |
| 2011/0296003 A1 | 12/2011 | McCann |
| 2015/0181020 A1* | 6/2015 | Fitzsimmons .... H04M 3/42221 379/67.1 |
| 2016/0212238 A1 | 7/2016 | Lacas et al. |
| 2017/0034581 A1* | 2/2017 | Short ............... H04N 21/47214 |
| 2017/0206417 A1* | 7/2017 | Aoyama ............... H04L 1/0061 |
| 2017/0249234 A1 | 8/2017 | Kalech et al. |
| 2018/0131731 A1* | 5/2018 | Jones .................. H04L 65/1059 |
| 2019/0189117 A1* | 6/2019 | Kumar ............... G06F 16/3329 |
| 2019/0190878 A1 | 6/2019 | Li et al. |
| 2020/0028879 A1 | 1/2020 | Lahiri et al. |
| 2020/0036989 A1* | 1/2020 | Heindel ................. H04N 19/33 |
| 2020/0241949 A1 | 7/2020 | Basu |
| 2020/0312348 A1* | 10/2020 | Shao .................... G10L 15/1815 |
| 2021/0158946 A1* | 5/2021 | Starobinets ............ G16H 10/60 |
| 2021/0399911 A1* | 12/2021 | Jorasch ............... H04L 12/1818 |
| 2021/0400142 A1 | 12/2021 | Jorasch et al. |
| 2022/0046059 A1 | 2/2022 | Pandurangi |
| 2022/0086393 A1 | 3/2022 | Peters et al. |
| 2022/0121776 A1* | 4/2022 | Johnston ............. G06F 21/6245 |
| 2022/0271962 A1 | 8/2022 | Patel et al. |
| 2022/0272134 A1* | 8/2022 | Jain ..................... H04L 65/4015 |
| 2022/0337537 A1 | 10/2022 | Lewis et al. |
| 2022/0414241 A1* | 12/2022 | Chittampally .......... G06F 21/84 |
| 2022/0415316 A1 | 12/2022 | Shaikh |
| 2023/0022374 A1 | 1/2023 | Nadir |
| 2023/0025718 A1 | 1/2023 | Varnavas et al. |
| 2023/0222236 A1* | 7/2023 | Devarao ................ G06N 20/00 726/29 |
| 2023/0370434 A1 | 11/2023 | Nadir et al. |
| 2024/0007351 A1 | 1/2024 | Nadir et al. |
| 2024/0219255 A1* | 7/2024 | Aseev .................... G05B 15/02 |
| 2025/0087020 A1* | 3/2025 | Chyn .................. G06V 10/143 |

OTHER PUBLICATIONS

Notice of Allowance issued in U.S. Appl. No. 17/862,448 mailed Feb. 23, 2023, 9 pages.
Office Action issued by the U.S. Patent and Trademark Office (USPTO) for U.S. Appl. No. 18/468,836, mailed Apr. 18, 2024, 22 pages.
Office Action issued by the U.S. Patent and Trademark Office (USPTO) for U.S. Appl. No. 17/741,528, mailed May 3, 2024, 18 pages.
Notice of Allowance issued by the U.S. Patent and Trademark Office for U.S. Appl. No. 18/468,836, mailed Aug. 13, 2024, 10 pages.
Office Action issued by the U.S. Patent and Trademark Office (USPTO) for U.S. Appl. No. 17/741,528, mailed Oct. 17, 2024, 23 pages.
Notice of Allowance issued by the U.S. Patent and Trademark Office for U.S. Appl. No. 18/468,836, mailed Dec. 12, 2024, 7 pages.
Office Action issued by the U.S. Patent and Trademark Office for U.S. Appl. No. 17/741,528, mailed Apr. 28, 2025, 19 pages.

* cited by examiner

SYSTEM AND METHOD FOR VISUAL IDENTIFICATION OF DISPLAYED APPLICATIONS IN ELECTRONIC COMMUNICATIONS

CROSS-REFERENCE TO RELATED APPLICATIONS

This application is a conversion of, and claims a benefit of priority under 35 U.S.C. § 119 from U.S. Provisional Application No. 63/237,335, filed Aug. 26, 2021, entitled "SYSTEM AND METHOD FOR VISUAL IDENTIFICATION OF DISPLAYED APPLICATIONS IN ELECTRONIC COMMUNICATIONS," the entire contents of which are hereby expressly incorporated by reference for all purposes.

TECHNICAL FIELD

This disclosure relates generally to computer-based collaboration. More particularly, embodiments relate to systems and methods for identifying risks resulting from the use of heterogeneous collaboration platforms. Even more particularly, embodiments relate to systems and methods for identifying the display of certain applications in the visual domains of heterogeneous collaboration platforms such as screen shares, webcams, image attachments to email or chat.

BACKGROUND

Screensharing (also known as desktop sharing or screen sharing) is an important feature of many online video/web-conferencing applications. Screen sharing allows a user to make applications, windows, or the entirety of the contents of their computer desktop or mobile device visible to other participants in a meeting. In many implementations, the user initiating the screen sharing selects which files, applications, windows, or desktops to share.

While screen sharing enhances collaboration by allowing all the participants in an online conversation to view and discuss the same shared contents at the same time, screensharing may pose privacy, compliance, or security, risks including, but not limited to, data loss prevention, because any application visible to one participant in a meeting is typically visible to all other participants. As an example, an online spreadsheet application window, visible in a shared screen window, could reveal sensitive financial information, personally identifiable information, etc., contained in the cells of the spreadsheet, whether it is shared intentionally or not. As another example, a design or diagramming application window in a shared screen window could contain proprietary information that is considered confidential. Finally, an image of an application could be shared as an attachment to an email message or during the course of a chat conversation.

It is becoming increasingly common for organizations to review collaboration sessions, such as recordings of online meetings to identify privacy, security, and compliance risks. When monitoring visual content from communications platforms like collaboration and chat applications for such risks, it is useful to analyze what happens when a participant shares their screen. Furthermore, analyzing images containing applications attached to emails or included in chat conversations is equally time consuming and must be done manually. Previously, the only way to review and identify instances where a screen share or attachment includes sensitive information was to manually review the entire content of a recorded conversation, email, or chat.

SUMMARY

Attention is thus directed to the system and methods disclosed herein. Embodiments of the present disclosure address the problem of reviewing computer-based collaborations by using visual-based computer detections to identify when an application window is shared during a collaboration. The ability to identify an application without manual intervention allows for consistent and efficient identification of visual risks.

Embodiments of the present disclosure address problems of manual review by using visual-based computer detections to identify when an application window is shared during a conversation, chat, or other visual portion of a session. The ability to identify an application without manual intervention allows for consistent and efficient identification of visual risks, thereby improving computer implemented security and compliance review technologies.

According to one embodiment, a security and compliance platform ingests content from a variety of communications sources, including collaboration platforms such as ZOOM, WEBEX, MICROSOFT TEAMS, etc., The visual, audio, and text content from these platforms are processed by a security and compliance platform and the security and compliance platform applies detections to identify potential regulatory, privacy, and security risks in the conversations. One of the detections that can be applied is the identification of application windows appearing during a collaboration session. The security and compliance platform identifies several categories of shared applications on screen, via webcam, whiteboard, or in a chat, including, but not limited to: office applications and documents, customer relationship management (CRM) and human resources (HR) applications, online development and infrastructure tools, email applications and portals, online financial applications, etc. Because these applications may contain sensitive personally identifiable information (PII), technical trade secrets, or highly confidential corporate information, there is meaningful utility in identifying instances when these applications are shared. Moreover, if the application shared detection is triggered, a corresponding workflow action may be implemented. According to one embodiment, the presence of the shared application will be flagged for further analysis in the review screen of the security and compliance platform. In the review screen, a human reviewer will examine the triggered detection to determine if the shared application presents a compliance, privacy, or security risk to the organization in the context of that specific conversation.

According to one embodiment, a set of screen images of displayed target applications can be analyzed to determine an app fingerprint for each target application. In one embodiment, the app fingerprint for a target application comprises a set of text and, in some cases, relationships between text. Frames of a video or still images are analyzed, and text extracted from frames. The text extracted from a frame or image can be compared to the app fingerprint for the target applications. If the text extracted from a frame or image matches an app fingerprint, the frame may be considered to potentially display the target application to which that app fingerprint corresponds. In other embodiments, visual features in addition to or as an alternative to text features are used. In other embodiments, other elements of a conversation (e.g., an audio portion, a chat, etc.) can be examined to identify instances where someone may have shared something and determine that further analysis may be desired. For example, a user may say (in a chat or audibly) "Let me share Excel . . . ," or some other application. In other embodiments, an image attachment to an email message or an attachment in a chat conversation may be analyzed to identify the presence of an application in that image file.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. As mentioned, applications such as HR applications, CRM applications, email applications, office applications (word processors/spreadsheets) and other applications may pose risks to an organization if displayed in a screen share, webcam, chat, or email, for example, during use of a video/web-conferencing application. Embodiments described herein provide computer-based technologies to automatically determine when a particular application is open on screen, whether as an entire window or as part of a shared desktop, as a desktop application, a browser application, a screenshot of the application in an open chat window, etc. This detection can be combined with other features such as the text extracted from video frames using optical character recognition (OCR) to determine what information was shared.

Figure 1:
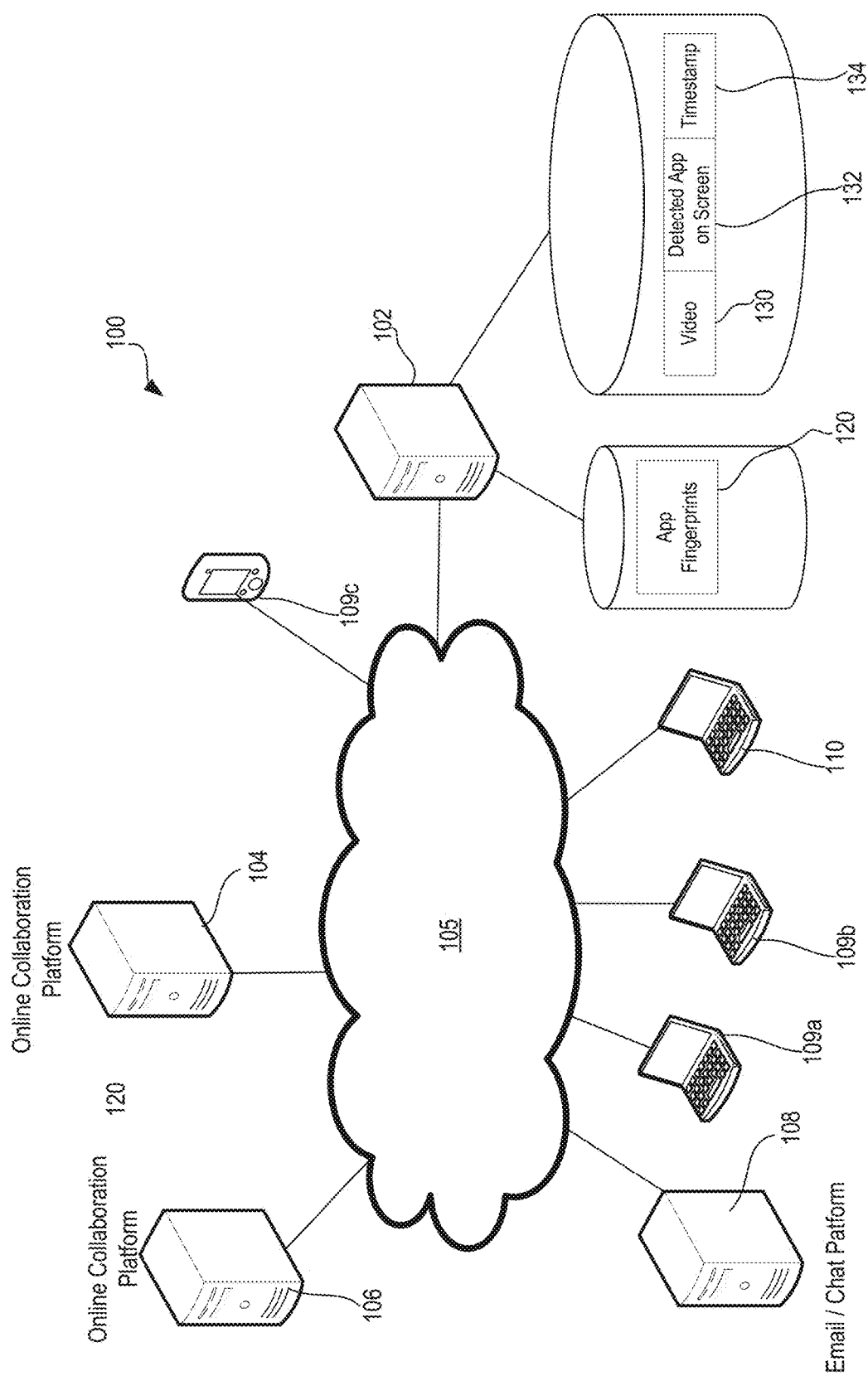
FIG. 1 is a diagrammatic representation of a computing ecosystem that comprises one embodiment of a security and compliance platform.

To those ends, among others, attention is now directed to systems and methods for visual identification of displayed applications in electronic communications. FIG. 1 is a diagrammatic representation of one embodiment of a computing ecosystem 100 that comprises a security and compliance platform 102 connected to heterogeneous online collaboration platforms and other communication platforms (online collaboration platform 104, online collaboration platform 106, email/chat/etc. platform 108) and client computers (e.g., client 109a, client 109b, client 109c, client 110) via network 105.

According to one embodiment, the online collaboration platforms are cloud-based collaboration platforms or other types of online collaboration platforms that operate independently to provide collaboration services to allow users to work together digitally online, such as by providing online video conferencing or meetings or other collaboration tools. An organization may use any number of independent online collaboration services or other communication platforms (e.g., independently owned or operated by different parties, or email or chat applications). In some cases, an organization's employees, or other agents at distributed client computers 109 may share data that may pose risk to the data security, privacy, and compliance obligations of the organization.

In one embodiment, the security and compliance platform 102 is a cloud-based system that provides tools to review electronic conversations (e.g., online chat sessions, online meetings, chat, email, or other collaborations) for compliance with an organization's security and privacy policies and for regulatory compliance. When a risk is detected, an action may be triggered, such as flagging the risk for further analysis in a review screen at a reviewer client computer 110, or for other remedial action.

The security and compliance platform 102 interfaces with the various online collaboration or communication platforms through any number of interfaces (e.g., application programming interfaces (API), etc.) to ingest content. The security and compliance platform 102 may also receive content from other communications sources, such as via direct upload. In general, the ingested content includes recordings of conversations, such as video recordings of online meetings, and can also include images from chat or email attachments. As would be appreciated, such recordings can include video of screen shares that occurred as part of the conversation.

More particularly, security and compliance platform 102 detects when certain target applications are open in screen shares. If a detection is triggered, a corresponding action may be executed. According to one embodiment, the presence of the shared application is flagged for further analysis in the review screen, or other remedial action. A reviewer at reviewer client computer 110 can examine the triggered detection to determine if the shared application presents a compliance, privacy, or security risk to the organization in the context of the specific conversation in which the application was detected.

To this end, the security and compliance platform 102 maintains a database or other data store of app fingerprints 120 for the target applications to be detected. An app fingerprint 120 for a target application may comprise a set of features that can be used to identify a target application on screen. The features may include textual features, visual features, or a combination thereof. In some embodiments, the app fingerprints for a target application may be embodied in a machine learning model, for example as a class.

According to one embodiment, the security and compliance platform 102 ingests or otherwise receives a video file embodying an online conversation that may include a screen share and samples the video to extract a set of frames. Compliance platform 102 compares frame characterizing data for the frames to the app fingerprints 120 and applies rules to the results of the comparison to determine if the presence of a target application was detected. If the detection is triggered—that is, for example, if the visual presence of a target application is detected—a corresponding action may be implemented. The presence of the target application may be flagged for further analysis in the review screen of the security and compliance platform 102. According to one embodiment, the video 130 may be stored in a database or other datastore in association with an indication of the detected target application 132 and timestamps 134 indicating when, in video 130, the target application is visible and, in some embodiments, the duration that the target application is visible. In a review screen, a human reviewer can examine the triggered detection to determine if the shared application presents a compliance, privacy, or security risk to the organization in the context of that specific conversation.

The frame characterizing data is data from or about a frame that can be used to detect the visual presence of a target application in the frame. In some embodiments, the frame characterizing data includes text extracted from the frame. In addition, or in the alternative, the frame characterizing data includes visual features extracted from the frame. In another embodiment, the frame characterizing data may be the frame image itself or the frame image in combination with text extracted from the frame. Compliance platform 102 may process a frame to generate at least a portion of the frame characterizing data if the frame characterizing data is not simply the frame image itself.

Figure 2:
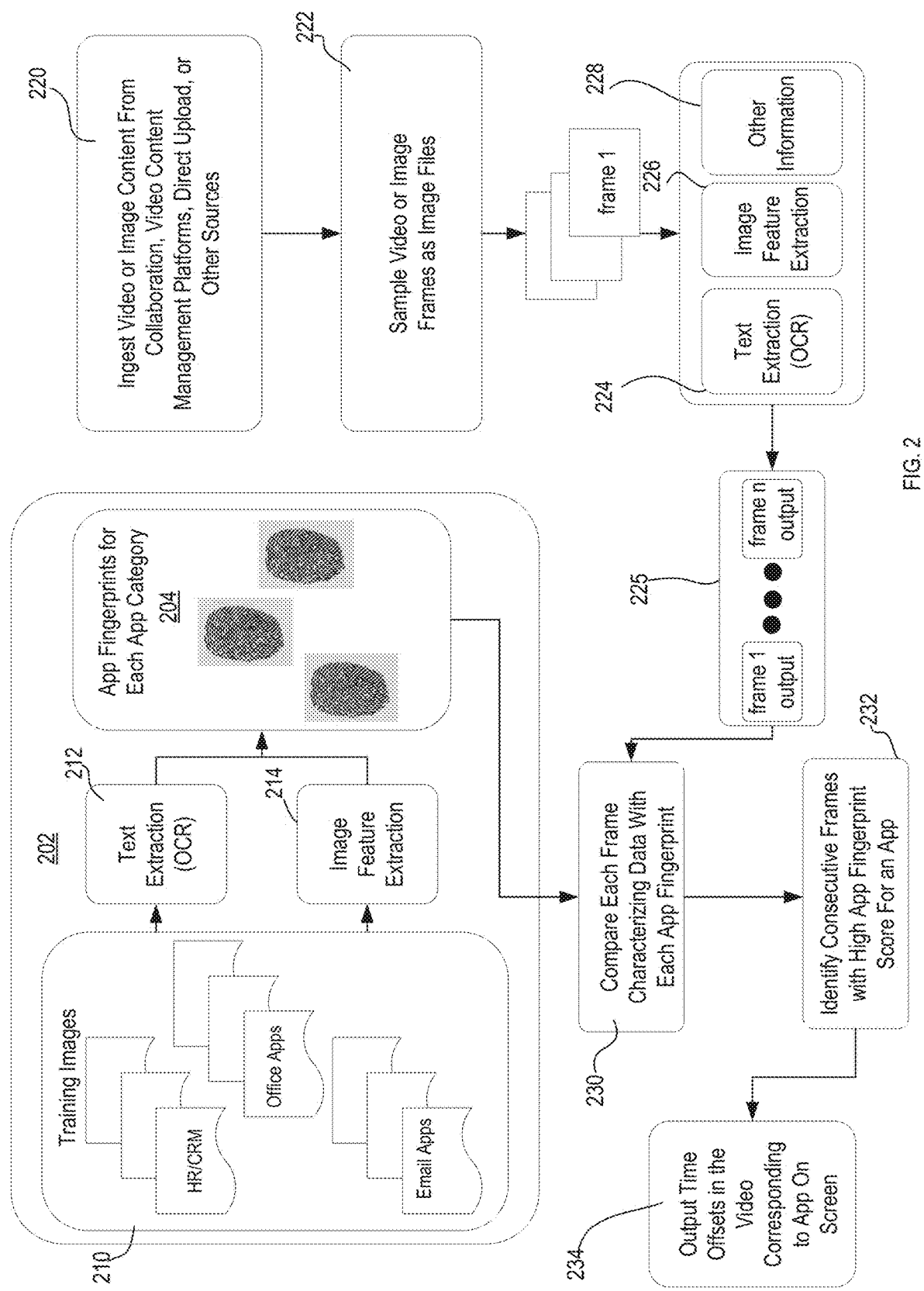
FIG. 2 is a block diagram illustrating one embodiment of processing for visual identification of displayed applications in electronic communications.

FIG. 2 is a block diagram illustrating one embodiment of visual identification of displayed applications in electronic communications as may be implemented by, for example, security and compliance platform 102 or other computer systems.

During a setup phase 202, application fingerprints 204 for a set of target applications are created. More particularly, an application fingerprint is created for each target application to be detected. An application fingerprint contains textual clues that identify a corresponding application when open on a screen. By way of example, but not limitation, textual features include text such as: names of menu items in order (Home, Insert, Draw . . . ); text on toolbar buttons, text in tooltips, URLS associated with the application to be detected. In some embodiments, the textual features for an application fingerprint are created based on domain knowledge. In other embodiments, the textual features are determined using machine learning techniques, including, but not limited to neural networks.

In addition, or in the alternative, an application fingerprint contains visual clues that identify a corresponding target application when open on a screen. Example visual clues include but are not limited to: logos, application buttons, fields, menus, formatting (e.g., grid structure for spreadsheets, or blocks of text for word processing applications). In some embodiments, the visual features are determined using machine learning techniques, including, but not limited to neural networks.

In one embodiment, each app fingerprint includes a combination of textual and visual clues that identify the corresponding target application when open on the screen. Visual and textual clues can be specified explicitly or learned automatically using a machine learning classifier or a neural network to extract features. In the latter case, a dataset of images and text from the target applications to be detected is collected and used as training data to train a classifier recognize the target applications. A classifier may be trained jointly on the images and extracted text, or different models may be created for images and extracted text.

According to one embodiment then, a training corpus of application screen images 210 (e.g., a corpus of static images) is created that contains screen images for each target application to be detected. For the purposes of classifier training each application screen image may be labelled with a corresponding target application. Preferably the training corpus of images 210 is robust to application variants such as different versions of each target application. Further, the training corpus of images 210 may include images of each target application in various states. The training corpus of images 210 may also include images in which parts of a target application are obscured by other windows from other applications or objects, such as mouse pointers or tooltips. Training image data corresponding to screen images 210 may be used to train a machine learning model. The training image data for an image may include, for example, text extracted from the image, visual features extracted from the image, the image itself or a combination thereof.

The images from the training corpus of images 210 may be processed to extract text from each image (e.g., text extraction (OCR) block 212). According to one embodiment, the result for an image is a set of locations in the image, delineated as rectangles, and the text found by the OCR software in each rectangle. Further the images may be processed by an image feature extractor to extract visual features from each image (e.g., image feature extraction block 214).

The textual features and/or visual features extracted from the images may be analyzed to identify the text and/or visual features that uniquely identify (or have a high correlation with) each corresponding target application and the textual and/or visual features may be stored as a fingerprint for the target application. In one embodiment, hardcoded rules may be used to compare frame characterizing data for a frame to app fingerprints 120.

In another embodiment, the textual features and/or visual features extracted from the images in corpus of images 210 may be used to train one or more machine learning classifiers. Various machine learning mechanisms may be used. In one embodiment, a machine learning classifier is trained to classify an input feature vector based on a reference set of feature vectors corresponding to the target applications. In such an embodiment, the machine learning classifier can compare the input feature vector to the reference set of feature vectors representing the known classes (i.e., target applications) to determine which of the reference set of feature vectors has the highest similarity to the input feature vector. The machine learning classifier can output the class (i.e., the target application) or score for the class associated with the reference feature vector having the highest similarity to the input feature vector as a classification for a video frame from which the input feature vector was created.

In some embodiments, textual features may be used to train a first machine learning classifier and visual features may be used to train a second machine learning classifier. At runtime, results of the classifiers may be combined to determine the highest confidence label for a video frame. In another embodiment, the feature vector for each training image represents a combination of textual and visual features. Such a classifier can classify an input feature vector of textual and visual features according to the target applications.

In another example embodiment, images 210, text extracted from images 210, or a combination thereof are input as training data for a machine learning classifier, such as neural network, to train the machine learning classifier for application detection. In such an embodiment, the relevant text or visual features may be determined by the machine learning algorithm and the app fingerprints may be considered to be embodied by the machine learning classifier (e.g., embodied by a neural network as class against which the neural network compares input data). In some embodiments, text data may be used to train a first neural network (or other machine learning model) and the images 210 used to train a second neural network (or other machine learning model). A third neural network may be trained on the outputs of the first neural network and second neural network to detect a target application visible in a frame.

In any case, the set of app fingerprints 204 may be embodied as one or more machine learning models trained on a training set of training image data (images, text, or other training data). One embodiment may thus include a machine learning classifier representing textual features of application screen images and target applications. One embodiment may include a machine learning classifier representing visual features of application screen images and target applications. One embodiment may include a machine learning classifier representing textual features and visual features of application screen images and target applications.

While setup phase 202 is illustrated as a discrete phase, setup phase 202 may be ongoing. For example, the set of app fingerprints may be updated periodically. Even more particularly, the machine learning model may be periodically retrained.

At runtime, video content is ingested from a collaboration platform, video content management platform, direct upload, or other communication source (block 220). For a given video, the video content is sampled to extract n frames as image files (block 222). In one embodiment, the video content is sampled every second—that is, a frame is extracted each second of the video as an image file. Other sample frequencies may also be used, as one skilled in the art would understand. The extracted frames may be processed, in some embodiments, to extract frame characterizing data for each frame (e.g., frame 1 output . . . frame n output) 225. In some embodiments, the frame image itself may be the frame characterizing data for the frame or a portion of the frame characterizing data.

For each frame, a set of frame characterizing data is used as an input for predicting the visual presence of a target application in the frame. As will be appreciated, the same algorithm that is applied to determine training image data from the training images (e.g., text/visuals) may be used to determine frame characterizing data.

In some embodiments, the frame characterizing data includes text extracted from the frame. For example, each frame may be processed using OCR techniques to extract text (block 224). According to one embodiment, the result for a frame image is a set of locations in the image, delineated as rectangles, and the text found by the OCR software in each rectangle.

In addition, or in the alternative, the frame characterizing data includes visual features extracted from the frame. For example, a frame image may be processed by an image feature extractor to extract visual features from the frame image (block 226). According to one embodiment, the text extraction and image feature extraction applied at blocks 224, 226 to a frame may be the same as applied at blocks 212, 214 to a training image.

In some embodiments, the frame characterizing data may include temporal metadata or things said during a call, written in a chat or email message, etc. For example, information spoken or typed by a user in a meeting, chat, email, etc., (block 228) can be examined to identify instances that may warrant further analysis. For example, a user may say (in a chat or audibly) "Let me share Excel . . . ," or some other application.

In one embodiment, the frame characterizing data for a frame comprises one or more feature vectors representing textual and/or visual features extracted from the frame. For example, a feature vector representing textual features and/or a feature vector representing visual features or a feature vector representing a combination of textual features and visual features.

In another embodiment, the frame characterizing data may be the frame image or the frame image in combination with text extracted from the frame.

The frame characterizing data for each frame is compared with each app fingerprint (block 230) and an app fingerprint score is determined. In one embodiment, the comparison may be a rules-based comparison. In an implementation that only considers textual features, for example, the Levenshtein distance between text extracted from the frame and each app fingerprint is calculated and a threshold is applied to determine if the frame is considered a match to given target app fingerprint—that is, a threshold is applied to determine if the frame has a high enough app fingerprint score to be considered a match to an app fingerprint. If the frame is considered a match to a given target app fingerprint, the time offset, and target app are flagged. Other ways of performing the comparison may also be used, as one skilled in the art would understand.

In another embodiment, the visual features, and not textual features, are analyzed. At block 230, frame characterizing data (e.g., the frame itself or an input feature vector representing the visual features extracted from a frame) may be processed using the machine learning classifier to generate a score for each target application. If the score for a particular target application is above a threshold, the frame may be considered to be a match to the target app fingerprint.

In yet another embodiment, a first machine learning classifier representing textual features of application screen images and target applications and a second machine learning classifier representing visual features of application screen images and target applications may be used together. At block 230, first frame characterizing data representing text extracted from the frame (e.g., an input feature vector representing the textual features extracted from the frame, or other frame characterizing data) may be processed using a first classifier to generate a first score for each target application and second frame characterizing data representing visual features from the frame (e.g., the frame image, an input feature vector representing the visual features extracted from the frame, or other frame characterizing data) may be processed using the second classifier to generate a second score for each target application. If the combined scores for a particular target application are above a threshold, the frame may be considered to be a match to the target app fingerprint. In another embodiment, a third classifier may be trained to use the outputs of the first classifier (text-based) and the second classifier (image feature-based) to make a final determination of whether the frame matches a target application fingerprint.

In still another embodiment, a machine learning classifier representing textual features and visual features of application screen images and target applications may be used. At block 230, frame characterizing data (e.g., the frame image and, in some embodiments, text extracted from the frame, an input feature vector representing the textual features and visual features extracted from the frame, or other frame characterizing data) may be processed using the classifier to generate a score for each target application. If the combined score for a particular target application is above a threshold, the frame may be considered to be a match to the target app fingerprint.

Some embodiments may utilize the fact that consecutive frames of a video are generally expected to contain similar information when determining if a frame matches an app fingerprint. For example, if one frame has a lower score with respect to a target application (e.g., a score representing a partial match to a target application fingerprint), but the next frame has a full match then, then the first frame may also be considered to be a match.

At block 232, consecutive frames with high app fingerprint scores are identified—that is, consecutive frames that are considered to be a match to a target app fingerprint are identified. At step 234, offset times corresponding to the time the target application was on screen in the video are output. For example, if the frames taken at times 15 s-25 s from a video are determined to match the target app fingerprint for "target application 1," then an indication that target application 1 appears at times 15 s-25 s may be output. In examples where ingested content is comprised of still images (e.g., images attached to emails or included in chat conversations), concepts such as comparing consecutive frames and determining offset times may not apply.

Figure 3:
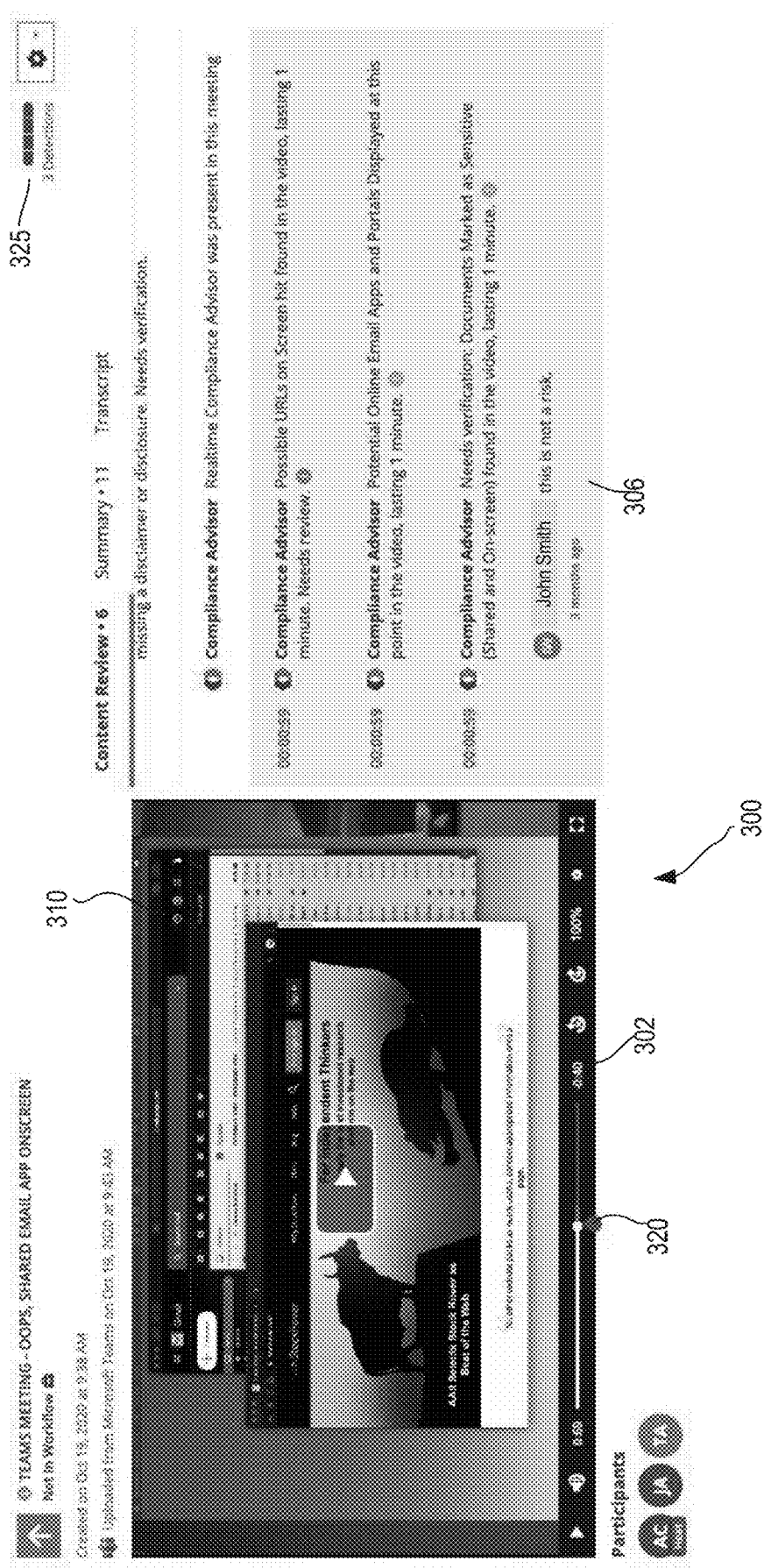
FIG. 3 is a diagrammatic representation of a review screen.

As discussed above, the results of visual identification of displayed applications in electronic communications may be displayed in a review screen of a security and compliance platform 102. FIG. 3, for example, illustrates a review screen 300 presented to review a video of a meeting which contains a screen share portion. The review screen includes a player portion 302 in which the reviewer can play the video of the screen share session and a notification portion 306 notifying the reviewer of potential risks as well as an aggregate risk score for the video. A pin 320 or other visual indicator may be placed on the player's video timeline to indicate the temporal location of a potential risk in the video. Review screen 300 also includes an overall risk indicator 325 for the video. In this example, the system has detected, among other potential risks, a risk at 00:59 of "Potential Online Email Apps and Portals Displayed at this point in the video lasting 1 minute." Here, the online email application 310 is detected even though it is partially obscured by another window in the screen share. Note that in examples where ingested content does not come from a video (e.g., still images from an email or chat), the resulting review screens may differ from the review screen shown in FIG. 3, as one skilled in the art would understand.

The results of visual identification of displayed applications in electronic communications may be used for other purposes as well, as one skilled in the art would understand. For example, an organization may want to analyze shared content for other reasons to identify other types of risks. Similarly, an organization may want to use the results to create a profile for a particular user that may frequently engage in risky behavior. In other examples, the results can be fed into other systems, such as for providing input to a real-time automatic risk detection system.

Figure 4:
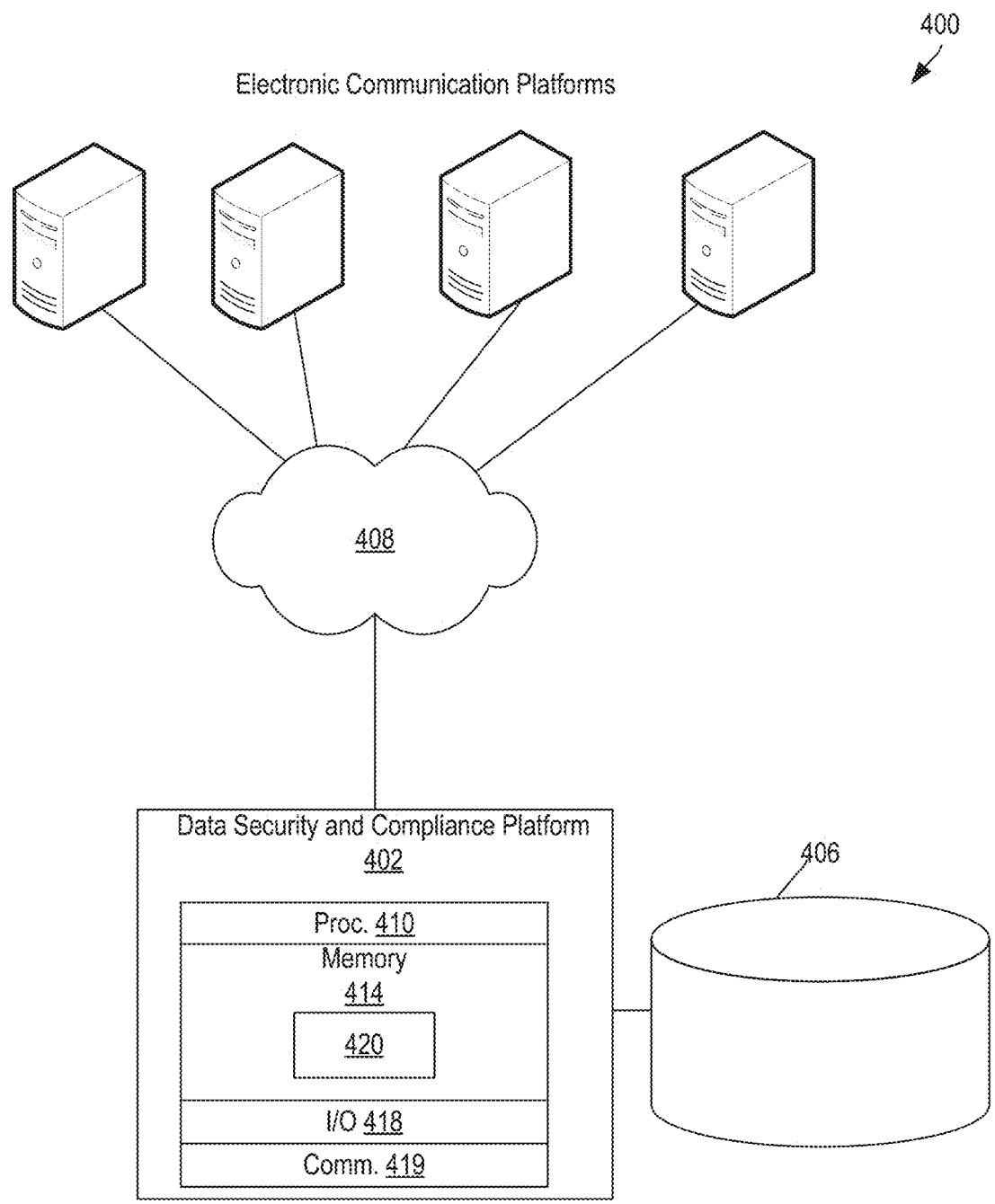
FIG. 4 is a diagrammatic representation of one embodiment of a network environment.

FIG. 4 is a diagrammatic representation of one embodiment of a system for visual identification of displayed applications in electronic communications. The system for visual identification of displayed applications in electronic communications may comprise one or more computer systems with central processing units executing instructions embodied on one or more computer-readable media where the instructions are configured to perform at least some of the functionality associated with embodiments of the present invention. In the illustrated embodiment, system 400 includes a computer system 402 having a computer processor 410 and associated memory 414. Computer processor 410 may be an integrated circuit for processing instructions. For example, computer processor 410 may comprise one or more cores or micro-cores of a processor. Memory 414 may include volatile memory, non-volatile memory, semi-volatile memory, or a combination thereof. Memory 414, for example, may include RAM, ROM, flash memory, a hard disk drive, a solid-state drive, an optical storage medium (e.g., CD-ROM), or other computer-readable memory or combination thereof. Memory 414 may implement a storage hierarchy that includes cache memory, primary memory, or secondary memory. In some embodiments, memory 414 may include storage space on a data storage array. Computer system 402 may also include input/output ("I/O") devices 418, such as a keyboard, monitor, printer, electronic pointing device (e.g., mouse, trackball, stylus, etc.), or the like. Computer system 402 may also include a communication interface 419, such as a network interface card, to interface with network 408, which may be a local LAN, a WAN such as the Internet, mobile network, or other type of network or combination thereof. Network 408 may represent a combination of wired and wireless networks that may be utilized for various types of network communications.

Memory 414 may store instructions executable by computer processor 410. For example, memory 414 may include code executable to provide an interface, such as an API or other interface to interface with heterogeneous electronic communication platforms, such as online collaboration systems, email/chat platforms, etc. According to one embodiment, memory 414 may include code 420 executable to provide a security and compliance platform, such as security and compliance platform 102. Data store 406, which may be part of or separate from memory 414, may comprise one or more database systems, file store systems, or other systems to store various data used by computer system 402.

Each of the computers in FIG. 4 may have more than one CPU, ROM, RAM, HD, I/O, or other hardware components. Portions of the methods described herein may be implemented in suitable software code that may reside within memory 414 or other computer-readable memory.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways to implement the invention.

It is also within the spirit and scope of the invention to implement in software programming or code the steps, operations, methods, routines, or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only, but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present), and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A system comprising:
a memory;
a processor; and
a non-transitory, computer-readable storage medium storing a set of instructions executable by the processor, the set of instructions comprising instructions for:
interfacing with a plurality of heterogeneous online communication platforms that operate independently to provide services that allow users to work together digitally online;
ingesting video content from the plurality of heterogeneous online communication platforms, the video content comprising video of screen sharing sessions from the plurality of heterogeneous online communication platforms;
processing the video content from the plurality of heterogeneous online collaboration platforms to identify applications open in the screen sharing sessions, wherein the video content comprises a video of a screen share from a respective communication platform, the video of the screen share comprising a plurality of frames, and wherein processing the video content comprises:
analyzing frames of the video of the screen share to determine frame characterizing data of respective frames, wherein analyzing the frames of the video comprises extracting visual features from the respective frames, the frame characterizing data of the respective frames comprising the visual features extracted from the respective frames;
comparing the frame characterizing data of the respective frames to target application fingerprints for a plurality of target applications, the target application fingerprints comprising visual features extracted from images of the target applications;
determining, based on the comparing, that a particular target application, from the plurality of target applications, was open in the screen share, wherein determining that the particular target application was open comprises:
determining that the frame characterizing data of the respective frames is a match to a target application fingerprint of the particular target application, wherein the target application fingerprint for the particular target application comprises visual features extracted from application screen images associated with the particular target application and indicative of the particular target application being visible in the application screen images, the application screen images showing the particular target application in a plurality of states; and based on the determining that the particular target application was open in the screen share, taking one or more remedial actions.

2. The system of claim 1, wherein one or more remedial actions includes flagging for review video or image content associated with the screen share.

3. The system of claim 1, wherein the frame characterizing data of the respective frames further comprises textual features extracted from the respective frames.

4. The system of claim 1, wherein the frame characterizing data of the respective frames is determined using one or more machine learning classifiers.

5. The system of claim 1, wherein the analyzing, comparing, and determining are performed using a machine learning model trained to recognize the plurality of target applications.

6. The system of claim 1, wherein the video of the screen share is a video of a completed screen sharing session.

7. A method comprising:
interfacing with a plurality of heterogeneous online communication platforms that operate independently to provide services that allow users to work together digitally online;
ingesting video content from the plurality of heterogenous online communication platforms, the video content comprising video of screen sharing sessions from the plurality of heterogeneous online communication platforms;
processing the video content from the plurality of heterogeneous online collaboration platforms to identify applications open in the screen sharing sessions, wherein the video content comprises a video of a screen share from a respective communication platform, the video of the screen share comprising a plurality of frames, and wherein processing the video content comprises:
analyzing frames of the video of the screen share to determine frame characterizing data of respective frames, wherein analyzing the frames of the video comprises extracting visual features from the respective frames, the frame characterizing data of the respective frames comprising the visual features extracted from the respective frames;
comparing the frame characterizing data of the respective frames to target application fingerprints for a plurality of target applications, the target application fingerprints comprising visual features extracted from images of the target applications;
determining, based on the comparing, that a particular target application, from the plurality of target applications, was open in the screen share, wherein determining that the particular target application was open comprises:
determining that the frame characterizing data of the respective frames is a match to a target application fingerprint of the particular target application, wherein the target application fingerprint for the particular target application comprises visual features extracted from application screen images associated with the particular target application and indicative of the particular target application being visible in the application screen images, the application screen images showing the particular target application in a plurality of states; and based on the determining that the particular target application was open in the screen share of the respective communication platform, taking one or more remedial actions.

8. The method of claim 7, wherein one or more remedial actions includes flagging for review video or image content associated with the screen share.

9. The method of claim 7, wherein the frame characterizing data of the respective frames further comprises textual features extracted from the respective frames.

10. The method of claim 7, wherein the frame characterizing data of the respective frames is determined using one or more machine learning classifiers.

11. The method of claim 7, wherein the analyzing, comparing, and determining are performed using a machine learning model trained to recognize the plurality of target applications.

12. The method of claim 7, wherein the video of the screen share is a video of a completed screen sharing session.

13. A system comprising:
a memory storing target application fingerprints for a plurality of target applications, the target application fingerprints for the plurality of target applications comprising visual features extracted from screen images of the target applications;
a processor; and
a non-transitory, computer-readable storage medium storing a set of instructions executable by the processor, the set of instructions comprising instructions for:
interfacing with a plurality of heterogeneous online communication platforms that operate independently to provide services that allow users to work together digitally online;
ingesting video content from the plurality of heterogeneous online communication platforms;
sampling the video content to extract frames of a given video;
analyzing the extracted frames of the given video to determine frame characterizing data of respective frames, the frame characterizing data of the respective frames comprising visual features extracted from the respective frames;
comparing the frame characterizing data of the respective frames to the target application fingerprints for the plurality of target applications;
determining, based on the comparing, that a particular target application, from the plurality of target applications, was open in a screen share of a respective communication platform associated with the given video, wherein determining that the particular target application was open comprises:
determining that the frame characterizing data of the respective frames is a match to a target application fingerprint of the particular target application, wherein the target application fingerprint for the particular target application comprises visual features extracted from application screen images associated with the particular target application and indicative of the particular target application being visible in the application screen images, the application screen images showing the particular target application in a plurality of states; and based on the determining that the particular target application was open in the screen share of the respective communication platform associated with the given video, taking one or more remedial actions.

14. The system of claim 13, wherein one or more remedial actions includes flagging for review video or image content associated with the screen share.

15. The system of claim 13, wherein the frame characterizing data of the respective frames further comprises textual features.

16. The system of claim 13, wherein the analyzing, comparing, and determining are performed using a machine learning model.

17. The system of claim 13, wherein the given video is a video of a completed screen sharing session.

* * * * *